United States Patent
Mikes

(10) Patent No.: US 8,846,178 B2
(45) Date of Patent: Sep. 30, 2014

(54) LAYERED FLAME-PROOF MATERIAL

(75) Inventor: Stephen Mikes, Granville, OH (US)

(73) Assignee: CVG Management Corporation, New Albany, OH (US)

( * ) Notice: Subject to any disclaimer, the term of this patent is extended or adjusted under 35 U.S.C. 154(b) by 619 days.

(21) Appl. No.: 13/017,719

(22) Filed: Jan. 31, 2011

(65) Prior Publication Data

US 2012/0003422 A1 Jan. 5, 2012

Related U.S. Application Data

(60) Provisional application No. 61/360,033, filed on Jun. 30, 2010.

(51) Int. Cl.
  *B32B 3/24* (2006.01)
  *B32B 5/18* (2006.01)
  *B32B 27/06* (2006.01)
  *B32B 37/12* (2006.01)
  *B32B 38/04* (2006.01)

(52) U.S. Cl.
  CPC .......... *B32B 5/18* (2013.01); *B32B 2307/3065* (2013.01); *B32B 2305/022* (2013.01); *B32B 2307/102* (2013.01); *B32B 2605/00* (2013.01); *B32B 2266/06* (2013.01); *B32B 37/12* (2013.01); *B32B 2307/304* (2013.01); *B32B 2038/047* (2013.01); *B32B 27/065* (2013.01)
  USPC .......................................... 428/138; 428/137

(58) Field of Classification Search
  USPC .................................................. 428/138, 137
  See application file for complete search history.

(56) References Cited

U.S. PATENT DOCUMENTS

| | | | |
|---|---|---|---|
| 4,764,420 A | 8/1988 | Gluck et al. | |
| 4,940,112 A * | 7/1990 | O'Neill | 181/290 |
| 5,554,830 A * | 9/1996 | Muller et al. | 181/290 |
| 5,622,662 A | 4/1997 | Veiga et al. | |
| 6,528,437 B1 * | 3/2003 | Hepfinger et al. | 442/38 |
| 7,279,214 B2 * | 10/2007 | Nicolai et al. | 428/137 |
| 2005/0031843 A1 | 2/2005 | Robinson et al. | |
| 2009/0047495 A1 | 2/2009 | Hubbs | |

OTHER PUBLICATIONS

Blaine R. Copenheaver, Notification of Transmittal of the International Search Report and the Written Opinion of the International Searching Authority or the Declaration, Oct. 11, 2011.

* cited by examiner

*Primary Examiner* — William P Watkins, III
(74) *Attorney, Agent, or Firm* — Kegler Brown Hill & Ritter; James J. Pingor

(57) ABSTRACT

Materials or composites that can provide a complete finished product to the transportation industry that meets or exceeds fire resistant regulations and standards, e.g., the UL 94 V-0 Flame Test Standard are disclosed. These materials combine aesthetic and functional properties that are not apparent in other flame proof insulation materials available in the industry a whole.

11 Claims, 5 Drawing Sheets

LAYERED FLAME-PROOF MATERIAL

CROSS-REFERENCE TO RELATED APPLICATIONS

This application claims the benefit of U.S. patent application Ser. No. 61/360,033 entitled "FLAME PROOF, SELF EXTINGUISHING, THERMALLY AND ACOUSTICALLY VIABLE VEHICLE INSULATION" and filed Jun. 30, 2010. The entirety of the above-noted application is incorporated by reference herein.

TECHNICAL FIELD

The subject innovation relates generally to the field of vehicle insulation systems and more particularly, to flame-proof, self-extinguishing acoustical and thermal vehicle insulation systems.

BACKGROUND

Flame-proof insulation is prevalent in the commercial transportation industry in various forms. Generally, in commercial mass transit, low-aesthetic, non-consumer-friendly insulation or barriers are used. For example, conventionally, hard fiber insulation panels or even various cellulose fiber and foam products with a foil layer for heat reflection are often used.

It will be understood that anti-flame, flame-resistant or flame-proof refers to materials that can resist the spread of flame. Additionally, another feature of these materials is that smoke density is very low; thus, hazardous materials are not produced or otherwise minimized. Hard fiber insulation panels are generally very easily processed and often installed in the means of mass transit, e.g., airline, bus, rail, and marine/ferry transport.

Over the years, various numbers of adhesives and binding fibers have been developed for use in the commercial transportation industry. In addition to industry standards, today, there are numerous government regulations that apply to the use and standardization of these products. Further, there are different levels of testing and standards that apply to the application and implementation/usage of the various materials that have been developed.

Today, in the United States, the specific level of testing that is applied to the development of these materials is the UL-94 V-0, flame test standard. Under this standard, there are three different methods of UL (Underwriters Laboratory) testing for different ratings:

I. Horizontal Burn
II. Vertical Burn
III. Very Thin Materials

Although flame-resistant materials exist generally, there exists a need in the art for a flame-resistant system for interior aesthetic insulation. Conventional fire-resistant materials most often employ hard fiber insulation panels and material that lack aesthetic appeal and comfort.

SUMMARY

The following presents a simplified summary of the specification in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, dual- or multi-layer insulation system that facilitates flame-resistance among other valuable characteristics. In an aspect, the innovation comprises a UL 94 V-0 compliant, flame-proof, self-extinguishing, thermal and acoustically viable vehicle insulation system that includes a contact layer of "Top Good" having a thickness of "A," a substrate "Barrier" layer having a thickness of "B" that are permanently bonded together and completely perforated. The material can then be additionally bonded to another substrate layer(s) and a foam layer(s) as per a desired or intended application. In operation, the layers are bonded via adhesive saturation with a bonding agent and activator to a thickness which is then processed using design specified tooling and press implanting pressure, heat and specified time, pertinent to the design specifics of the innovation.

In aspects, the thermal conductivity "R" value of the product with thickness of 1 inch or 25.4 mm equals that of 3.15 hr·ft2·F/Btu or better. The acoustical absorption ratios of the material are related to or determined by the design specified variable thickness of "X," the composite makeup of being single layer design or double/multi-layer design and the variable thickness of "D" and thickness "C" and "E" of FIGS. 1, 2, 4, respectively.

In yet other aspects, the contact or "top good" layer is comprised of a perforated vinyl or cloth/fabric bonded to a barrier layer which is also perforated. The top good and barrier layers can be simultaneously perforated in embodiments to enhance acoustical and/or thermal properties of the material.

In other aspects the substrate layer includes at least one layer, but not limited to one layer, of saturated open-cell foam. The material can further include an extruded acrylic or PVC (Poly Vinyl Chloride) alloy sheet, if desired. For example, Boltaron™ 4335 (manufactured by Boltaron Performance Products, LLC of Newcomerstown, Ohio) or the like can be employed. Boltaron™ 4335 is a proprietary, fire retardant, extruded acrylic/PVC alloy sheet. Additionally, Boltaron™ offers a UL 94 V-0 rating, excellent impact strength, abrasion resistance, chemical resistance, rigidity and thermoformability.

The materials can be bonded together using an adhesive and an activating agent that is applied and saturates the open cell foam, which is further processed to bond the materials together using design specific tooling and press utilizing pressure heat and specified time to permanently bond the components together.

In still other aspects, the material includes a layer of PSA, or Pressure Sensitive Adhesive which is applied after the layers are bonded together. The material can be die cut or processed in another manner to cut the perimeter and internal design specified attributes of a customer specified part. Still further, the material is an interior insulation system of customer specified attributes dependent upon design specified variables that is applicable to, but not limited to, use in the air, marine, ground, rail, and military transportation industries, among others.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
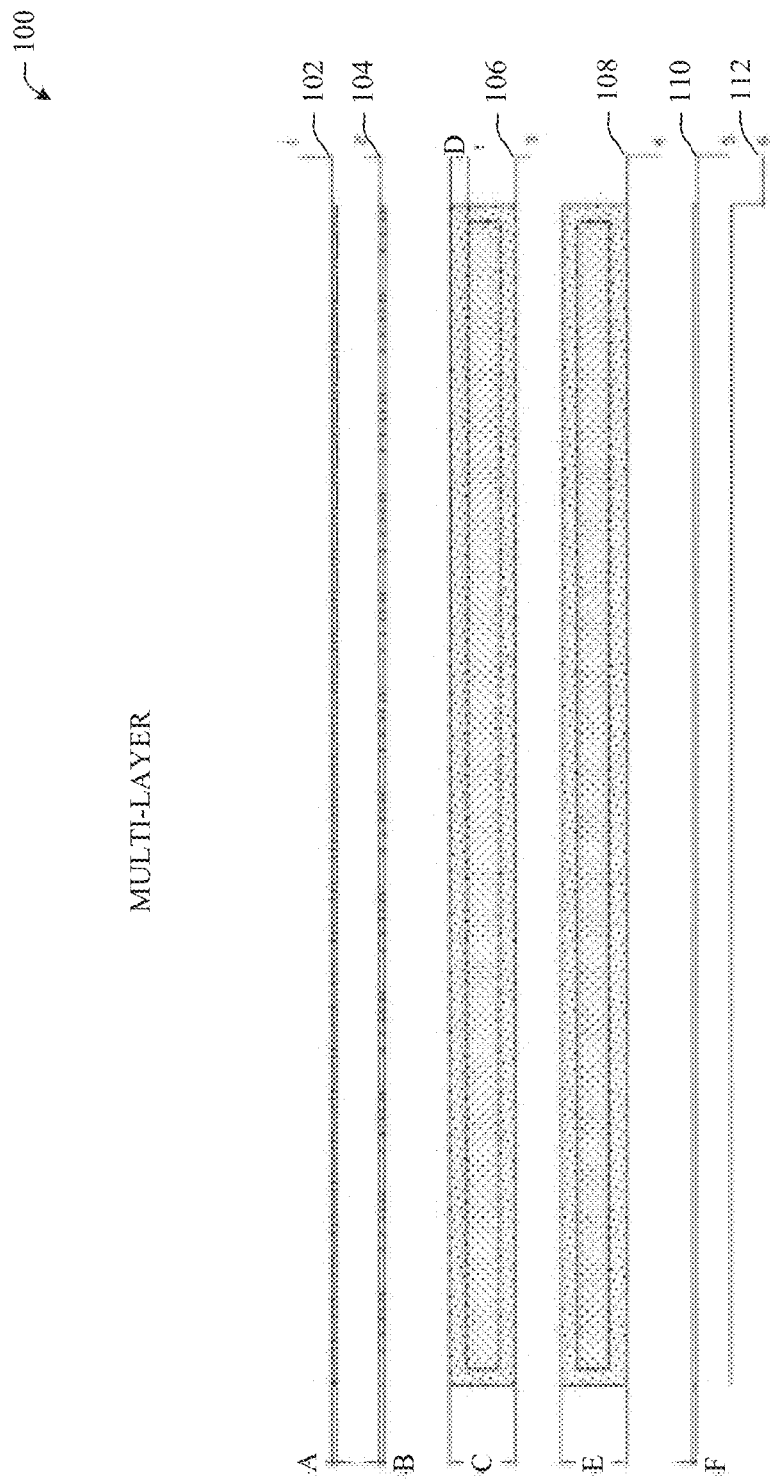
FIG. 1 illustrates an example cross-section of the materials in a dual layer design in accordance with aspects of the innovation.

The following terms are used throughout the description, the definitions of which are provided herein to assist in understanding various aspects of the subject innovation. "Anti-flame," "flame-resistant" or "flame-proof" refers to material that resists the spread of flame. Additionally, another feature of these materials is that smoke density is very low; thus, hazardous materials are not produced or are otherwise minimized.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

Although hard fiber and non-aesthetic flame resistant materials exist in some forms, there is a need in the art for a system of aesthetic insulation, e.g., for use with respect to interiors in the passenger transportation industry. While there have been various components developed throughout the years, none have been combined in a manner and as a composite final product material for use in the transportation industry.

The innovation discloses a material or composite that can provide a complete finished insulation or interior product to the transportation industry that meets or exceeds regulations and standards, e.g., the UL 94 V-0 flame test standard. This composite combines aesthetic and functional properties that are not apparent in other flame-proof insulation materials available in the industry a whole.

In aspects, the innovation provides a level of flame-proof composite in a final finished trimmed product interior insulation system that can combine the flame protection (e.g., UL 94 V-0 flame protection), along with thermal, acoustical, impact mitigating padding. Additionally, the innovation can be colored to customer specifications, chemically resistant, anti-microbial, and UV (ultra violet) resistant as desired or appropriate. In specific aspects, the innovation can be used for vehicle interiors as well as for use in the air, marine, rail, ground and military vehicle industries, among others.

In development, the flame test specification applied to this composite was the UL 94 V-0 Test Standard. Testing of the composite was performed by a third party testing facility for independent results. While a specific test standard is described herein, it is to be understood that other standards can be employed to exhibit the features, functions and benefits of the innovation described and claimed herein.

As described above, today, in the United States, the specific level of testing or standard that is applied to the development of this type of material is the UL-94 V-0, flame test standard. There are three different methods of UL (Underwriters Laboratory) testing for different ratings:

I. Horizontal Burn
II. Vertical Burn
III. Very Thin Materials

Referring first to the Horizontal Burn (HB) test, the specific standard is UL-94 HB. In accordance with the testing procedure, a specimen is supported in a horizontal position and is tilted at 45°. A flame is applied to the end of the specimen for 30 seconds or until the flame reaches the one inch mark. If the specimen continues to burn after the removal of the flame, the time for the specimen to burn between the 1 and 4 inch marks are recorded. If the specimen stops burning before the flame spreads to the 4 inch mark, the time of combustion and damaged length between the two marks is recorded. Three specimens are tested for each thickness.

In accordance with the HB test, specimens must not have a burning rate greater than 1.5 inches/minute for thicknesses between 0.120 and 0.500 inches and 3 inches/minute for thicknesses less than 0.120 inches. Additionally, specimens must stop burning before the flame reaches the 4 inch mark.

Turning now to Vertical Burn (VB) testing, the standard that applies today is the UL-94 V. In accordance with the rating procedure, a specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

In order to obtain a V-0 rating, the specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. Finally, no specimen can have glowing combustion remain for longer than 30 seconds after removal of the test flame.

A V-1 rating requires specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens must not drip flaming particles that ignite the cotton. Finally, no specimen can have glowing combustion remain for longer than 60 seconds after removal of the test flame.

Another vertical burn rating, V-2, states that specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens can drip flaming particles that ignite the cotton. Finally, no specimen can have glowing combustion remain for longer than 60 seconds after removal of the test flame.

Other vertical testing includes the 5V, 5V-A and 5V-B tests. In accordance therewith, testing is done on both bar and plaque specimens. With regard to the procedure for bars, a bar specimen is supported in a vertical position and a flame is applied to one of the lower corners of the specimen at a 20° angle. The flame is applied for 5 seconds and is removed for 5 seconds. The flame application and removal is repeated five times. The procedure for plaques is the same as for bars except that the plaque specimen is mounted horizontally and a flame is applied to the center of the lower surface of the plaque.

To achieve a 5V rating, specimens must hot have any flaming or glowing combustion for more than 60 seconds after the five flame applications. Additionally, the specimens must not drip. Finally, the specimens must not be destroyed in the area of the flame.

A 5V-A rating differs in that specimens must hot have any flaming or glowing combustion for more than 60 seconds after the five flame applications. Specimens must not drip flaming particles that ignite the cotton. Finally, plaque specimens must not exhibit burn through (a hole).

A 5V-B rating differs even more in that specimens must not have any flaming or glowing combustion for more than 60 seconds after the five flame applications. Specimens must not drip flaming particles that ignite the cotton. Finally, plaque specimens may exhibit burn through (a hole).

VTM level of testing applies to very thin materials. The test results in a rating of VTM-0, VTM-1 or VTM-2. This test is used for materials that are thin, or are too flexible or may distort, shrink or flex during ordinary vertical testing. In accordance with the procedure, an 8×2 inch specimen is rolled longitudinally around a ½ inch diameter mandrel and taped on one end. When the mandrel is removed, the specimen forms a cone. The cone is supported in a vertical position and a flame is applied to the bottom of the specimen. The flame is applied for three seconds and then removed until flaming stops at which time the flame is reapplied for another three seconds and then removed. Two sets of five specimens are tested. The two sets are conditioned under different conditions.

To achieve a VTM-0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame. Finally, no specimen shall have flaming or glowing combustion up to a mark 5 inches from the bottom of the specimen.

The VTM-1 rating requires that the specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens must not drip flaming particles that ignite the cotton. No specimen can have glowing combustion remain for longer than 60 seconds after removal of the test flame. Finally, no specimen shall have flaming or glowing combustion up to a mark 5 inches from the bottom of the specimen.

Similarly, VTM-2 requires that the specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens can drip flaming particles that ignite the cotton. No specimen can have glowing combustion remain for longer than 60 seconds after removal of the test flame. No specimen shall have flaming or glowing combustion up to a mark 5 inches from the bottom of the specimen.

Referring initially to FIG. 1, an example dual foam layer design 100 of the innovation is shown. As illustrated, the example multi-layer design can include six materials, 102, 104, 106, 108, 110, 112. It is to be appreciated that, while specific materials are described, the list of materials may not be all encompassing. In other words, other aspects exist that comprise additional or a subset of the materials (or components) described herein. As well, it is to be understood that materials having substantially the same or similar properties can be substituted while still exhibiting the features, functions and benefits described herein. These alternative aspects are to be included within the scope of this specification and claims appended hereto.

A first material 102 is a top good such as vinyl, cloth or leather. This material 102 can be colored or patterned aesthetically to a customer preference or specification. The material 102 can have a thickness "A" perforated throughout. Alternatively, as described herein, material 102 can be applied pre-perforation and thereafter perforated together with underlying materials and components so as to enhance acoustical and/or thermal properties of the material(s).

A second material 104 is a substrate or barrier layer (e.g., Boltaron™ 4335). This layer can be adjoined to the first material 102 by either flame lamination method or via an adhesive, such as 3M™ adhesive transfer tapes (e.g., 9372W, 9372DKW, 9375W) or the like. It will be appreciated that many 3M™ adhesive transfer tapes are acrylic based and specially formulated to provide a permanent bond between substrates in environments requiring regulatory compliance with various flame retardant standards, such as UL 94 V-0/2. The material 104 can have a variable thickness "B" perforated throughout. As with the first material 102, the second material 104 can be perforated pre- or post-attachment. In other words, it is to be understood that, in aspects, during manufacture, the first and second materials are bonded prior to perforating. This combined perforation enhances the acoustical absorption (and thermal) properties of the material.

In aspects, the materials can be a treated textile, for example FAIL SAFE 2010™ (manufactured by CMI Automotive of Elkhard, Ind.) which is a fire-resistant treated rayon/polyester nonwoven with acrylic/urethane fire-resistant coating.

A third material 106 is a foam layer 1, e.g., open cell foam. The foam layer 1 106 can have a design specification variable thickness "C" and adhesive saturation design specification variable thickness "D."

A fourth material 108 is a foam layer 2, e.g., open cell foam. The foam layer 2 108 can have a design specification variable thickness "E" and adhesive saturation design specification thickness as shown in foam layer 106. In aspects, ELASTOFLEX™ TF23971 Isocyanate manufactured by the BASF Company can be employed in the adhesive saturation process. Additionally, SURFYNOL™ TG Sufactant and DABCO™ T catalyst can be used in the adhesive saturation process. It will be understood that other active ingredients can be employed in alternative aspects without departing from the spirit and scope of the innovation.

In examples, the foam can be CR SAFGUARD™ Fire Resistant Cushioning from Chestnut Ridge Foam, Inc., Latrobe, Pa., or the like. It is to be understood that CR SAFGUARD™ is a fire-resistant cushioning that is manufactured utilizing low smoke polychloroprene latex compound. The cushioning is open-cell and breathable.

A fifth material 110 is a substrate, backing board layer. Not inherent to design success, the fifth material 110 can be optional and based on customer specification and application, e.g., plastic or fiber board substrate with material design specification variable thickness "F." It will be appreciated that alternative aspects can employ ballistic-rated backing layers or other customer-specified layers as desired or applicable. These alternative aspects are to be included within the scope of the disclosure and claims appended hereto.

A sixth material 112 can be a PSA, Pressure Sensitive Adhesive Layer. Not inherent to design success, the sixth material 112 can be optional based on customer specification and application.

In addition, a UV (ultraviolet) protectant can be applied so as to enhance longevity of the product. For example, BLOCKade™ Protective Topcoat or the like can be employed for advanced protection and cleaning ability.

Figure 2:
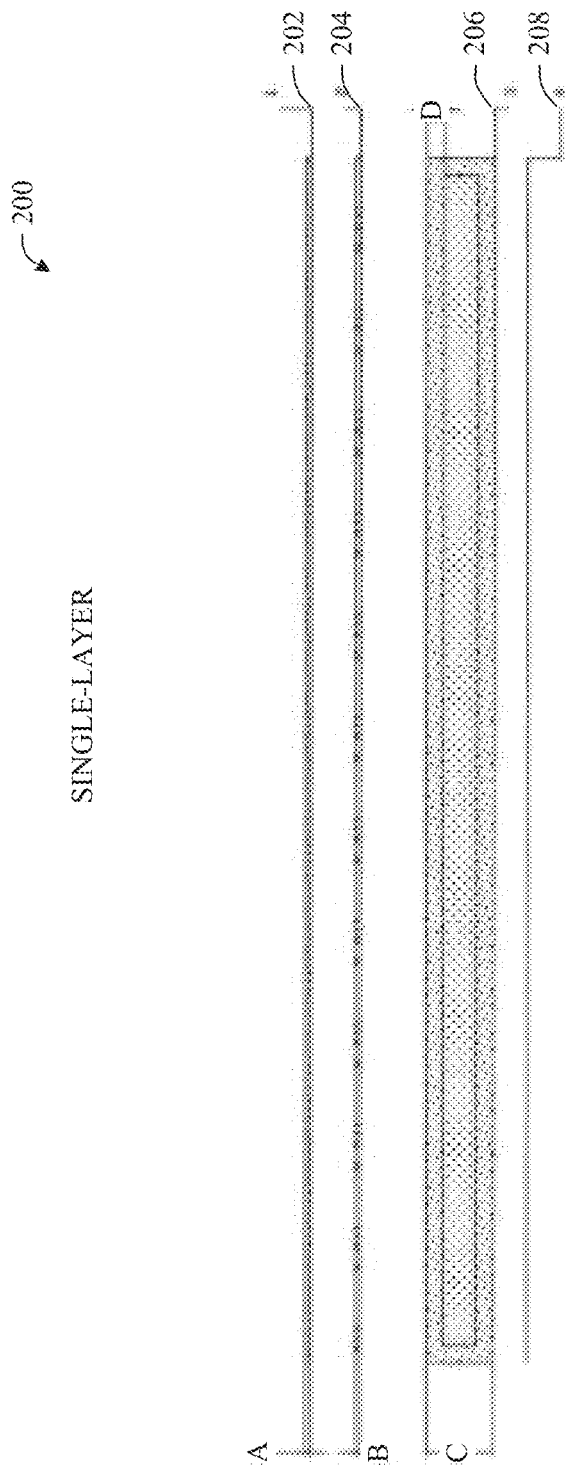
FIG. 2 illustrates an example cross-section of the materials in a single layer design in accordance with aspects of the innovation.

Referring now to FIG. 2, an example single foam layer design 200 in accordance with aspects of the innovation is shown. The following description includes a brief description of design variables and materials, aspects may not encompass all of the materials shown. As well, other aspects may encompass additional (or fewer) materials by design or application.

The example shown in FIG. 2 is illustrated without a backing board layer (e.g., 110 of FIG. 1). It is to be understood that a backing board layer is to be included within the scope of this disclosure herein and claimed appended hereto.

A first material 202 can be top good can be a fabric such as vinyl, cloth or leather. The fabric material 202 can be colored or patterned to customer specification with design variable thickness "A" perforated throughout. Similar to FIG. 1, the perforation can occur pre- or post-attachment, e.g., to enhance acoustical and thermal characteristics of the material.

A second material 204 can be a substrate or barrier layer. The second material 204 can be adjoined to top good material 204, e.g., via either flame lamination method or adhesive. The material 204 can have a customer design specification variable thickness "B" perforated throughout. As described with reference to FIG. 1, the perforation can occur post-bonding of the first and second materials.

A third material 206 is a foam layer, e.g., open cell foam. The material 206 may have a design specification variable thickness "C" and adhesive saturation design specification variable thickness "D."

A fourth material, 208, is a PSA, Pressure Sensitive Adhesive layer. Not inherent to design success, the layer 208 can be optional, e.g., based on customer specification and application.

Figure 3:
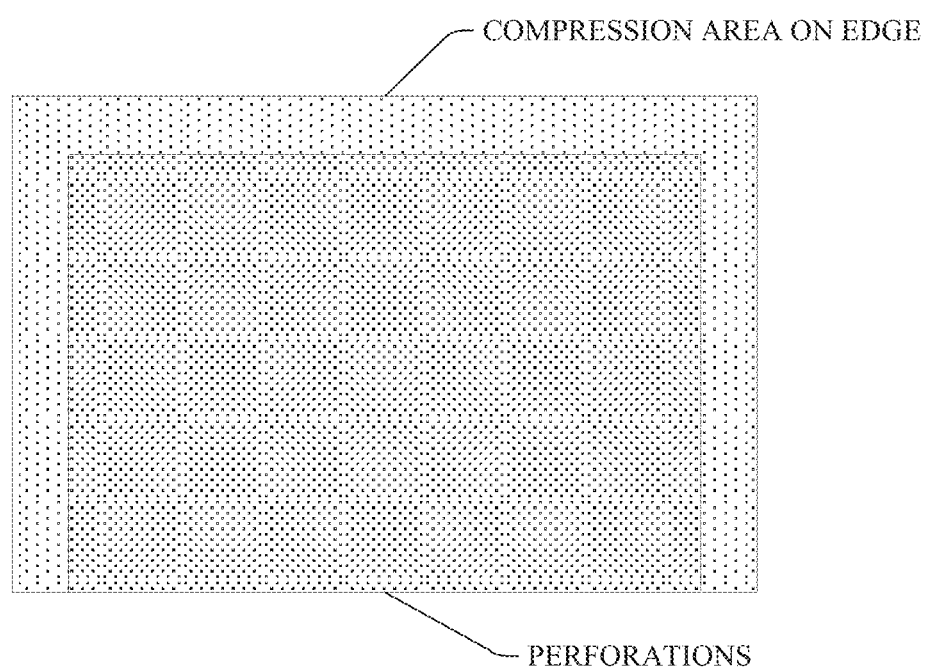
FIG. 3 illustrates an overhead view of the exposed "A" surface of an example panel in accordance with aspects of the innovation.

FIG. 3 illustrates an example overhead perspective view of surface "A" in accordance with aspects of the innovation. It will be appreciated that this view depicts attributes of the innovation from a top-down view of the top good layer. For example, the illustration shows the perforation of the first layer (e.g., 102, 202). Additionally, a debossed edge of the examples (100, 200) can be seen in FIG. 3.

Figure 4:
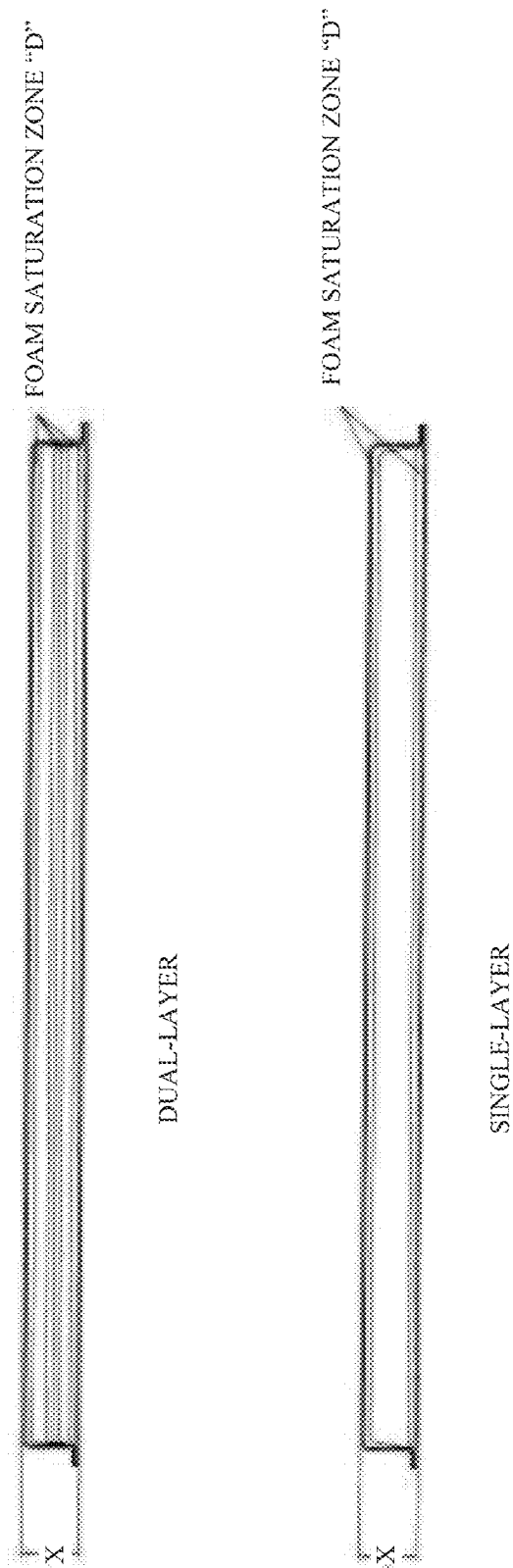
FIG. 4 illustrates a cross-section view of an exposed edge of a finished panel, in both dual layer designs (Top) and single layer designs (Bottom) in accordance with the innovation.

Referring now to FIG. 4, cross sections of processed aspects, e.g., dual and single foam layer aspects, respectively, are shown. It will be understood that the figure illustrates design variables and attributes of the innovation.

A debossed edge of each of the examples is shown. A foam saturation zone "D" of adhesive to bond composite is identified. Still further, example material thickness design specification variable thickness "X" based on customer specifications and application is shown.

As described supra with reference to FIGS. 1 to 4, the subject innovation discloses a flame proof, self-extinguishing, thermally and acoustically viable vehicle insulation system. As will be appreciated by those skilled in the art, the innovation enables a significant advancement in the state of the art. The described embodiments of the innovation can accomplish this by new and novel methods that are configured in unique and novel ways and which demonstrate previously unavailable, but preferred and desirable, capabilities and properties. As well, it is to be understood that aspects can exhibit enhanced acoustical dampening characteristics over other aspects.

The description set forth herein describes designs, functions, means, and methods, of implementing the innovation in connection with the illustrated embodiments. It is intended to be understood, however, that the same or equivalent functions and features may be accomplished by alternate embodiments that are also intended to be encompassed within the spirit and scope of the innovation.

Figure 5:
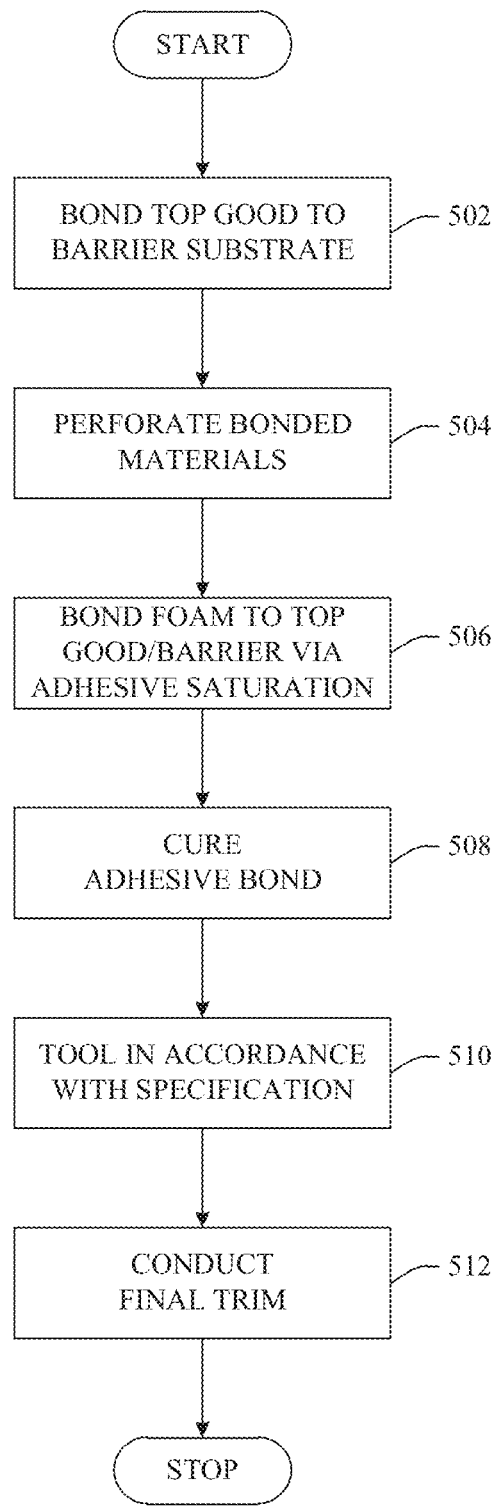
FIG. 5 illustrates an example flow chart of procedures that facilitate manufacture in accordance with an aspect of the innovation.

FIG. 5 illustrates a methodology of manufacturing in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. Moreover, not all illustrated acts may be required to implement a methodology in accordance with the innovation.

As illustrated in FIGS. 1 and 2, the flame proof, self-extinguishing thermally- and acoustically-viable vehicle insulation system includes a 1) "top good" contact layer (102, 202) and 2) substrate "barrier" layer (104, 204). At 502, these materials 1 (102, 202) and 2 (104, 204) can be joined together in a method that provides permanent (or near permanent) bonding with no delamination, either through adhesive or physical bonding methods. Once bonded, at 504, the materials can be perforated, e.g., to enhance acoustical dampening (and thermal) performance.

Similarly, at 506, the foam layer (106, 206) can be bonded to the "top good" and "barrier" through the use of an adhesive saturation means. Thereafter, at 508, a curing process is used in both the single layer and dual/multi-layer designs, e.g., FIG. 1 and FIG. 2. This production method is used to physically bond materials 1 (102, 202), 2 (104, 204), and 3 (106, 206) together through the use of a bonding agent which is then applied with a chemical activator along with the physical application of heat, pressure and a design specified amount of time, e.g., based on the customer specified variables of the composite.

At 510, these variables can then applied with design specific tooling and a mechanical press method of applying these modes of producing the final product or multi-level product. If identified in a design specification, PSA (pressure sensitive adhesive) is applied to the composite (act not shown in the methodology). The product incurs a final trim to produce a customer specified part (or shape) at 512.

The aforementioned process produces a composite, material or product as shown in FIGS. 3 and 4, with variables dependent on the customer's specified product design and final application use.

One primary attribute of the flame-proof and self-extinguishing characteristics of the innovation is accomplished with both the multi-layer component materials as well as the method of processing that bonds the various components of the innovation permanently (or near permanently) together. It will be appreciated that alternative means of bonding can be employed without departing from the spirit and/or scope of the innovation and claims appended hereto. These alternative aspects are to be included within the scope of this disclosure and claims appended hereto.

The thermal and acoustical attributes of the innovation can be achieved by both the physical properties of the various components of the innovation along with the processing method used to assemble the components into the innovation's final state. For example, while vinyl has specific thermal and acoustical properties, an act of perforating the vinyl together with its backing substrate enhances sound level dampening characteristics into the one or more foam layers bonded thereto. In other words, the simultaneous perforation generates perforations that continuously extend from the top good, through the barrier and to the foam layer. Thus, acoustical absorption can be maximized or otherwise enhanced.

The thermal conductivity "R" value of the innovation is directly related to the product's design specified variable of thickness "X" as seen in FIG. 4. Generally, in aspects, the "R" value of innovation for a ½ inch or 12 mm (millimeter) design specified variable thickness value for "X" in FIG. 4 gives a final "R" value for the innovation of 1.57 hr·ft2·F/Btu. For a 1 inch or 25.4 mm design specified variable thickness the value for "X" in FIG. 4 gives a final "R" value for the innovation of 3.15 hr·ft2·F/Btu. It will be appreciated that these values represent a sizable improvement for the innovation when compared with conventional products which are not UL 94 V-0 certified flame-proof and self-extinguishing.

The acoustical absorption ratios of innovation are again inherently related to the customer specified and design specified variables of thickness "X" and whether, in fact, the innovation is of the single- or multi-layer (e.g., dual-layer) foam design of FIGS. 1, 2, and 4. The absorption abilities of the materials are related to the thickness of design specified variable thickness "D" and thickness "C" and "E" from FIGS. 1 and 2, thickness "X" and "D" from FIG. 4

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A UL 94 V-0 compliant, flame proof, self-extinguishing, thermally and acoustically viable vehicle insulation system, comprising:

a non-woven contact layer having a first thickness; and a substrate "barrier" layer having a second thickness that is bonded to the contact layer, wherein the bonded non-woven contact layer and substrate "barrier" layers are simultaneously perforated;

at least one open cell foam layer, wherein the at least one open cell foam layer is bonded to the substrate "barrier" layer via an adhesive saturation design specification;

wherein each of the layers is bonded together using an adhesive and an activating agent that is applied and saturates the at least one open cell foam layer, wherein the layers are further processed to bond each of the materials together using a design specified tooling and press utilizing pressure, heat and specified time to bond each of the layers together.

2. The vehicle insulation system of claim 1, further comprising one of a plastic or fiber board substrate that is bonded to the at least one foam layer.

3. The vehicle insulation system of claim 1, further comprising a pressure sensitive adhesive layer that is bonded to the at least one foam layer.

4. The vehicle insulation system of claim 1, wherein a thermal conductivity "R" value with a combined layer thickness of 1 inch equals at least 3.15 hr·ft2·F/Btu.

5. The vehicle insulation system of claim 1, further comprising an extruded acrylic or PVC alloy sheet fixedly attached to the bonded contact layer and substrate "barrier" layers.

6. The vehicle insulation system of claim 1, further comprising means for tooling that physically configures the vehicle insulation system to a customer specification.

7. The vehicle insulation system of claim 1, wherein the vehicle insulation system is applicable to air, marine, ground, rail, space or military transportation industries.

8. The vehicle insulation system of claim 1, wherein the at least one open cell foam layer comprises a fire-resistant cushioning including a low smoke polychloroprene latex compound.

9. The vehicle insulation system of claim 1, wherein the substrate "barrier" layer comprises a treated textile including a fire-resistant, treated rayon and polyester nonwoven material having at least one of an acrylic fire-resistant coating or a urethane fire-resistant coating.

10. The vehicle insulation system of claim 1, further comprising an ultraviolet protectant applied to the surface of the non-woven contact layer.

11. The vehicle insulation system of claim 2, wherein the plastic or fiber board substrate includes a ballistic-rated backing layer.

* * * * *